United States Patent [19]
Wallack et al.

[11] Patent Number: 5,589,247
[45] Date of Patent: Dec. 31, 1996

[54] MAGNETIC RECORDING MEDIUM HAVING AN EMBOSSED BACKCOAT LAYER

[75] Inventors: David A. Wallack, Ventura, Calif.; Donald M. Lewis, Hudson Township, St. Croix County, Wis.; John D. Munter, Oakdale; Peter J. Silbernagel, Woodbury, both of Minn.; Robert V. Heiti, Troy Township, St. Croix County, Wis.; Yuko Yoshida, Kanagawa, Japan

[73] Assignee: Minnesota Mining and Manufacturing Company, St. Paul, Minn.

[21] Appl. No.: 592,770

[22] Filed: Jan. 26, 1996

Related U.S. Application Data

[63] Continuation of Ser. No. 353,959, Dec. 12, 1994, abandoned, which is a continuation of Ser. No. 994,930, Dec. 22, 1992, abandoned.

[51] Int. Cl.$^6$ ....................................................... G11B 5/68
[52] U.S. Cl. ................... 428/141; 428/143; 428/148; 428/163; 428/187; 428/323; 428/328; 428/329; 428/336; 428/408; 428/694 BR; 428/694 BN; 428/694 BB; 428/900
[58] Field of Search ................................. 428/141, 143, 428/148, 163, 187, 323, 328, 329, 336, 408, 694 BR, 694 BN, 694 BB, 900

[56] References Cited

U.S. PATENT DOCUMENTS

| | | | |
|---|---|---|---|
| 3,734,772 | 5/1973 | Schnell et al. | 117/235 |
| 3,772,081 | 11/1973 | Franer | 117/239 |
| 3,979,541 | 9/1976 | Desourdis | 428/181 |
| 4,135,031 | 1/1979 | Akashi | 428/323 |
| 4,328,935 | 5/1982 | Steel | 242/192 |
| 4,474,843 | 10/1984 | Miyoshi | 428/212 |
| 4,567,083 | 1/1986 | Arioka et al. | 428/141 |

(List continued on next page.)

FOREIGN PATENT DOCUMENTS

| | | |
|---|---|---|
| 61-98530 | 5/1986 | Japan . |
| 2-156417 | 6/1990 | Japan . |
| 2-281419 | 11/1990 | Japan . |
| 3-203812 | 9/1991 | Japan . |
| 3-292613 | 12/1991 | Japan . |
| 1303971 | 1/1973 | United Kingdom . |

OTHER PUBLICATIONS

Edward D. Cohen, Edwin J. Lightfoot, and Edgar B. Gutoff, "A Primer on Forming Coatings," *Chemical Engineering Proogress*, Sep. 1990, pp. 30–36.

Manual G. Velarde and Christiane Normand, "Convection," *Scientific American*, Jul. 1980, vol. 243, No. 1, pp. 3 and 93–108.

Charles M. Hansen and Percy E. Pierce, "Cellular Convection in Polymer Coatings—An Assessment," *Ind. Eng. Chem. Prod. Res. Develop.*, vol. 12, No. 1, Jan. 1973, pp. 67–70.

*Primary Examiner*—Stevan A. Resan
*Attorney, Agent, or Firm*—Charles L. Dennis, II

[57] ABSTRACT

Coated polymeric sheet comprising polymer substrate a cross-linked polymer, wherein the coating is characterized by:

A. As being smooth, having a surface roughness not greater than 0.05 nanometers $R_a$, except that;

B. in the otherwise smooth surface, a multiplicity of depressions having depth ranging from 1 to 90% of the thickness of the coating.

Backside coatings (containing carbon black in the cross-linked polymer) for magnetic recording tapes benefit from this invention by improved winding characteristics. The concept described is a replacement for rough random surface texture, formerly used in backside coatings, with a controlled surface texture. The process disclosed can also be used to make alphanumeric symbols on the pigment binder coating.

6 Claims, 2 Drawing Sheets

U.S. PATENT DOCUMENTS

| | | | |
|---|---|---|---|
| 4,568,600 | 2/1986 | Oho | 428/145 |
| 4,582,757 | 4/1986 | Miyoshi | 428/329 |
| 4,598,014 | 7/1986 | Miyoshi | 428/323 |
| 4,612,235 | 9/1986 | Ushimaru | 428/216 |
| 4,663,217 | 5/1987 | Yamaguchi | 428/212 |
| 4,696,846 | 9/1987 | Kato | 428/65 |
| 4,745,017 | 5/1988 | Miyoshi | 428/141 |
| 4,751,797 | 6/1988 | Fujimori | 51/395 |
| 4,756,856 | 7/1988 | Choinski | 264/22 |
| 4,778,707 | 10/1988 | Arioka | 428/141 |
| 4,871,606 | 10/1989 | Matsuura | 428/147 |
| 5,062,021 | 10/1991 | Ranjan | 360/135 |
| 5,082,709 | 1/1992 | Suzuki et al. | 428/64 |
| 5,169,703 | 12/1992 | Miyazaki | 428/141 |

MAGNETIC RECORDING MEDIUM HAVING AN EMBOSSED BACKCOAT LAYER

This is a continuation of application Ser. No. 08/353,959 filed Dec. 12, 1994 now abandoned which is a continuation of 07/994,930 filed Dec. 22, 1992, now abandoned.

TECHNICAL FIELD

The present invention relates to magnetic recording media, and particularly to improved magnetic media having a backside coating which provides excellent tracking and winding characteristics.

BACKGROUND

Magnetic recording media generally comprise a flexible, non-magnetizable support or substrate having two major surfaces. The substrate may have a magnetizable coating on both major surfaces or sides or on just one side and a non-magnetizable backside coating on the opposite side. The former case is more typical of disk media, and the latter is typical of tapes. The medium, when in the form of a tape, typically travels along a tape path and over a record or read head during use, and is wound upon itself on a hub or reel for storage.

With continuing advances in magnetic recording technology leading to thinner tapes, faster winding speeds and higher recording densities, related performance problems become increasingly likely. For instance, magnetic tape tends to build up static charge during use. If the charge is not dissipated, data loss and errors in recording may result.

A phenomenon known as scattered wind occurs when air becomes trapped beneath the rapidly moving tape. The entrapped air causes layer-to-layer slippage, with the result being poor wound roll formation and possible tape edge damage.

When the magnetic surface of the tape is made extremely smooth to reduce noise in recording, running stability may deteriorate. The smooth surface has a high coefficient of friction, causing the tape to stick to guides and heads when stopping and starting. The accuracy of read/write operations is sacrificed.

Backside coatings can be formulated to improve tape conductivity, opacity, durability, winding and tracking characteristics. For instance, backside coatings can be made intentionally rough in order to reduce friction and air entrapment. Unfortunately, new problems may be introduced with this approach. The roughness can be imprinted on the magnetic surface during storage due to layer-to-layer contact or calendering, thereby compromising the data recording properties of the tape.

A durable backside coating which allows air to escape during winding while maintaining an unembossed, smooth magnetic recording surface is needed.

DISCLOSURE OF INVENTION

In one aspect the invention can be summarized as a coated polymeric sheet comprising a polymeric substrate and a cross-linked polymeric coating on the substrate, wherein the coating is characterized by having a multiplicity of protrusions from or depressions in the average surface having a height or depth, as the case may be, ranging from about 1 to 90 percent of the thickness of the cross-linked polymeric coating.

The depressions or protrusions may have a curved cross section, or the depression may be V-shaped (e.g., v-grooves). By curved cross section, it is meant that a cross section of the protrusion or depression has a curved outline, for example like a trough or U on a microscopic scale. For depressions having curved sides, the depth generally ranges from 1 to 50 percent of the coating thickness.

In the case of the polymeric coatings having depressions, except for the depressions (grooves), the surface of the polymeric coating is smooth, having a surface roughness not greater than 0.05 micrometers $R_a$. Surface roughness can be measured in a number of ways known in the art. One useful technique is by interferometry, and another is by means of a profilometer (e.g., Dektak model 3030 from Sloan Instruments). $R_a$ refers to the arithmetic average roughness.

The inventive coatings can be made opaque, i.e., sufficiently opaque for the purposes of magnetic recording media or other sheet materials which interact with devices which detect the presence or absence of light (e.g., tape drives).

Another aspect of the invention is a coated polymeric sheet like that just described (although not necessarily quite as smooth), but having a multiplicity of small protrusions made of the cross-linked polymer material and having a height above the average coating surface of 1 to 50 percent of the thickness of the coating itself. Such protrusions, or the depressions of the sheet previously described, can be made in the shape of alphanumerics or other identifying symbols or indicia. Thus, a trademark or identification code could be placed on the sheet as a microscopic embossment or relief design.

Looking at the inventive sheet in the plan view, or at a normal angle to the sheet, this description will hereinafter refer to the land area and the depression area. The land area means the area of the coating which is not part of the depressions. The depression area means the part of the plan view area which is occupied by the depressions.

The depressions can be continuous, elongate grooves. In cases in which the coated sheet is a tape and the grooves are oriented lengthwise parallel to the longest dimension of the tape, the ratio of land to depression areas can be found by observing a cross section of the tape, in which the top surface appears as a broken line. The ratio of land to depression area would be the ratio of the sum of lengths of the broken top surface line (from one depression to the next) to the sum of the lengths of the gaps at the surface where each depression begins and ends. The ratio of land area to depression area can typically range from 0.01/1 to 10/1.

One can see the depressions or protrusions optically, and the correspondence of the optically observable features to thickness differences can be verified by measurements, such as interferometry or (in the case of larger features) profilometer measurements.

One advantageous application of this invention is in the backside of magnetic recording tapes. The objective in that case is to achieve a back surface which will release easily from the very smooth magnetic layer as a reel of tape is unwound and subject to start/stop operation. The winding characteristics discussed under Background are improved.

DETAILED DESCRIPTION

Figure 1:
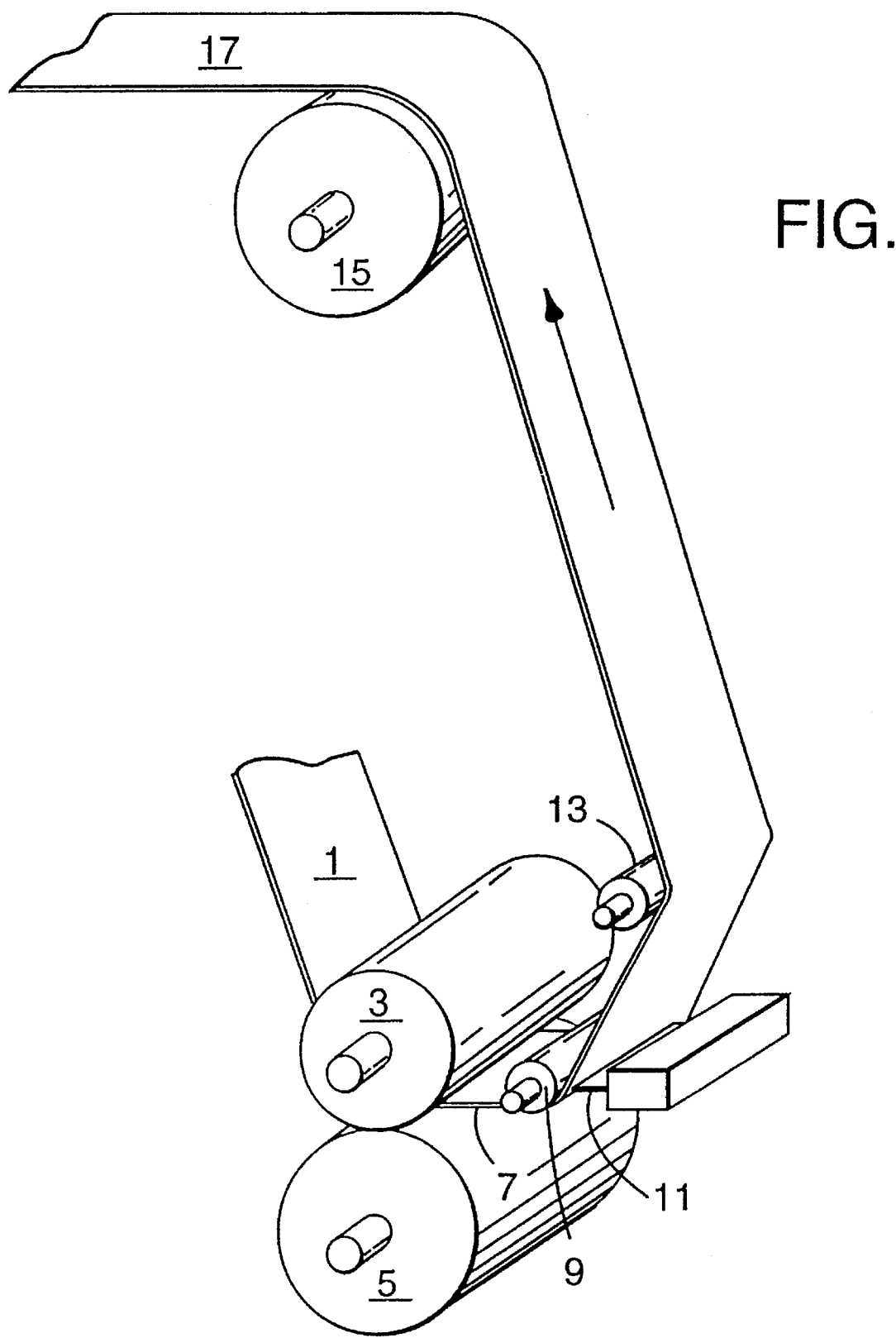
FIG. 1 is a flow diagram of the process for making a magnetic recording medium having a patterned backside coating in accordance with this invention.

The remainder of this description will concentrate on backside coatings for magnetic recording tapes and processes for making such tapes. However, the invention described can be applied in general to polymeric sheets having cross-linked polymer coatings, and the magnetic recording tapes described are considered a subgenus of the overall generic article invention of coated polymeric sheets having a plurality of depressions or protrusions as described. The invention can be applied to magnetic recording disks (e.g., diskettes) to modify their surfaces.

The substrate polymeric film can be any such film, especially those used in the manufacture of magnetic recording tapes, for example polyester. The polymeric film is generally less than 100 micrometers thick, preferably 4 to 75 micrometers, more preferably 4 to 40 micrometers thick.

The substrate may also have one or more coatings beside the inventive coating. For example, it might have a magnetizable recording layer on the surface opposite to the surface on which the inventive coating is deposited. There may also be additional coatings on the same side of the substrate as the inventive coating (e.g., primer or subbing layers). Thus the inventive coating could be deposited on an existing coating.

The cross-linked polymeric coating may be a pigment binder coating which is, for purposes of this description, defined as a coating comprising any pigment dispersed and fixed within a polymeric binder matrix. Carbon black is a typical pigment, but other pigments are within the broad scope of this invention, such as titania, alumina, and magnetic materials, such as iron oxide powder and magnetic metal powder.

The cross-linked polymer or binder can be any binder which can be cross-linked or cured and coated on a polymeric film. If the coating is a pigment binder coating, the binder must also be one into which the pigment can be dispersed. Binder polymer systems for dispersing various pigments, including carbon black, are known in the art. Typical binders comprise blends of polyvinyls and polyurethanes. One useful type of binder system is found in Harrell, U.S. Pat. No. 4,837,082, see Example 5.

The carbon black dispersed in the binder is preferably of a particle size less than 200 nanometers. The processes for making the dispersion of carbon black or another pigment in polymeric binders and for coating the dispersions onto polymeric sheeting substrates are well understood. Generally, a mixture of the polymer, pigment, dispersant, and solvent is blended together and milled in an apparatus such as a sand mill or ball mill for a time sufficient to obtain desired uniformity, viscosity, and other characteristics (e.g. gloss). It is desirable to use a solvent blend at least 50% of which has a vapor pressure greater than 50mm Hg at ordinary room temperature (22° C.). In one aspect of this invention, the solids concentration of the dispersion is less than 70 weight percent, preferably in the range of 10–60%. Viscosity is generally in the range of 2 to 10,000 centipoise.

A process for applying the inventive coating will be explained with reference to FIG. 1. A polyester substrate 1 which may have a magnetic layer already coated and dried on a first surface is passed between a nip roll 3 and a gravure-patterned coating roller 5. It is not necessary to have the magnetic layer already applied to the substrate. The backside may be coated before the magnetic layer. The small grooves in the coating roller 5 pick up the backside coating dispersion (applied to the coating roller by application means known in the art but not shown in FIG. 1) and transfer it to the uncoated surface of the polyester sheet. The gravure pattern size, as is known to those skilled in the art, directly affects the wet coating weight.

Other coating methods known to the art may be used, and each one generally includes a means for adjusting coating thickness. Dry coating thickness also depends on the solids concentration in the dispersion.

The polyester substrate with the wet backside coating 7 travels over a series of two idler rolls 9 and 13 so that a smoothing device 11 positioned between the idler rolls contacts the sheet and eliminates any residual gravure roll pattern from the coating.

Before the backside coating has dried or cross-linked, the coated polyester substrate is then passed over and in contact with roller 15 (having a plurality of protrusions or depressions on its surface) which is heated to a controlled temperature. The protrusions or depressions in the surface of roller 15 are preferably in a regular pattern. Roller 15 contacts the sheet on the first surface. The heat transferred from the protrusions (or from the surface surrounding the depressions) on roller 15 to the backside coating creates corresponding protrusions or depressions as described previously. The surface of roller 15 can be heated by a stream of heated air directed at the part of the roller surface opposite the part which contacts the coated sheet (back side of the roller), by internally heating the roller (e.g., by electrical resistance heater or hot fluid), or by any other convenient heating means.

The temperature of the surface of roller 15 is generally at least 2° C. higher than the temperature of the wet backside coating on the coated sheet as it approaches the roller, but the roller surface temperature should not be greater than the glass transition temperature of the polymeric sheet. A typical range for the temperature difference between the roller surface and the wet surface of the coated web is 5°–60° C. One set of conditions would be: roller surface temperature of 20°–40° C. and wet side of coated sheet temperature of 5°–15° C. The temperature of the wet coating can be less than ambient temperature because solvent evaporation from the coating can cause evaporative cooling.

The depth of the depressions (or height of protrusions) can be varied by adjusting the temperature difference between the coated sheet and roller 15, greater temperature differences resulting in more pronounced or deeper depressions. The depression depth can also be adjusted by changes in backside coating wet thickness and viscosity of the dispersion. Dispersions with lower viscosity are more likely to form depressions.

The time of contact between the coated sheet and roller 15 is typically in the range of 0.01 to 0.2 seconds. This is controlled by the degrees of wrap of the coated sheet around roller 15 and by the speed at which the sheet travels over the roller. Conditions which have been used in the development of this invention are: roller 15 102 mm diameter, 90° wrap and a web, speed of 15–305 m/min. Depressions about 150 nm deep have been formed at a web speed of 40 m/min. and a temperature difference between the surface of roller 15 and the coated sheet of about 15° C.

For convenience, from this point on, the discussion will be in terms of roller 15 having protrusions of various types and coatings having a plurality or multiplicity of depressions. In addition, for convenience, reference will from time to time be made to the patterned coating or backside (e.g. patterned backside resulting after the sheet 1 has passed over roller 15) because frequently the protrusions are formed in a pattern. However, a pattern is not required, and the protrusions could be completely random. The depressions between protrusions on roller 15 may have an aspect ratio (ratio of greatest depth to width) greater than 1.5/1. A typical protrusion height is at least 5 micrometers.

The coated web with the patterned backside 17 travels through an oven to remove residual solvents and dry the coating. The binder polymer is also at least partly cured in the oven. The term cured means polymerized or cross-linked into a more stable state than an uncured polymer mass. The dried web may proceed to further processing steps, such as calendering to a certain roughness specification. The finished sheet can be slit into magnetic recording tape.

During the contact time between the coated sheet and roller 15, the temperature difference discussed above causes a temperature gradient within the wet backside coating. The coating regions nearest the protrusions on the roller 15 have a higher temperature, and hence a lower surface tension, than the adjacent coating regions. As a result, a surface tension gradient may be established in the coating. At the same time, solvent from the coating is evaporating, which may cause a drying rate gradient across the surface of the wet coating. An approximation of the pattern of the roller 15 is thus induced into the coating.

ALTERNATIVE COATING METHOD

There is another method for forming the depressions in the coating. Instead of using the heated roller as shown in FIG. 1, one could use an embossing means or patterned tool, such as an embossing roller (which may be heated) and an opposed smooth nip roller between which the coated sheet would be conveyed. The embossing means (which may have features 0.2 micrometers to tens of micrometers in depth or height) would impress the pattern of depressions into the viscous coating, after which the coating would be cured or cross-linked.

One way to accomplish this is to use a polymeric coating which can be cross-linked by ionizing radiation, such as electron beam (e-beam). An example of such a coating composition is found in U.S. Pat. No. 4,889,895. The coating can be dried (but not cured) and then softened by raising its temperature by means of an embossing roll heated to a temperature sufficient to bring the backside coating above its glass transition temperature. The pattern of grooves or depressions can be embossed into the softened, compliant coating, and it can be cured by e-beam of sufficient dosage just after embossing, to fix the pattern in the coating. More conventional thermal curing can also be used.

If the magnetizable coating is already on the side of the substrate opposite the backside, it may be important to maintain the smoothness of the magnetizable coating. That is, the embossing of the backside should not cause roughness or irregularities in the magnetizable coating. This is accomplished by: ensuring that any rollers which contact the magnetizable coating (eg. nip roller) are very smooth; controlling temperatures of the roll in contact with the magnetizable coating, the embossing roll and the web; and controlling nip pressure and time of the web in contact with the embossing roll. Any smooth roll contacting the magnetizable coating could be cooled in order to maintain that coating below its glass transition temperature to prevent alteration of its surface. Alternatively, it may be desired to impart a texture to the magnetizable surface, in which case the very smooth roll would be replaced by a textured roll.

Figure 2A:
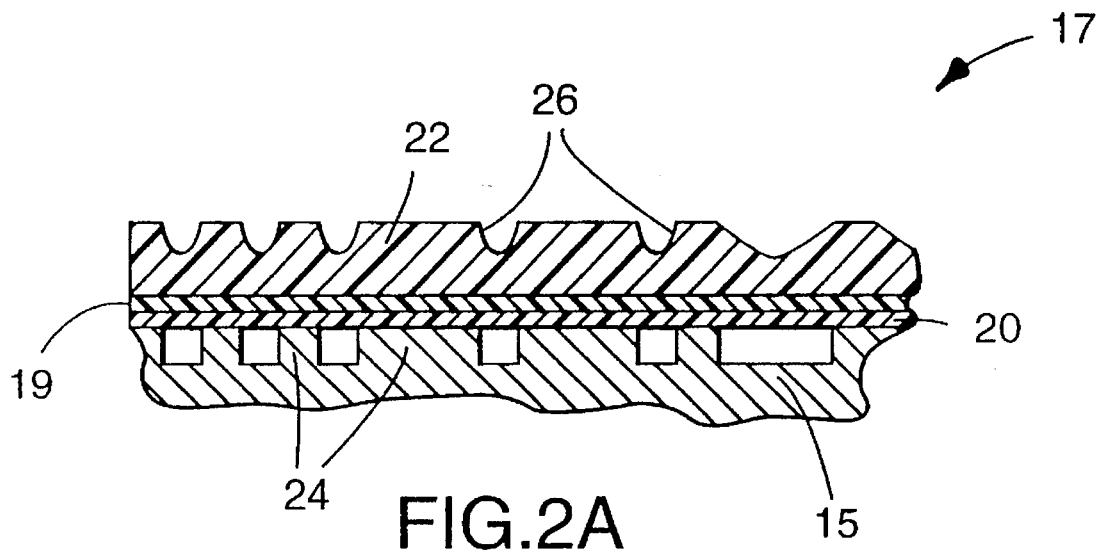
FIG. 2A is a cross-sectional representation (not to scale or in correct proportion) of one embodiment of magnetic recording tape in accordance with this invention, shown immediately above a roller 15 (shown in fragmentary view) having protrusions 24.
Figure 2B:
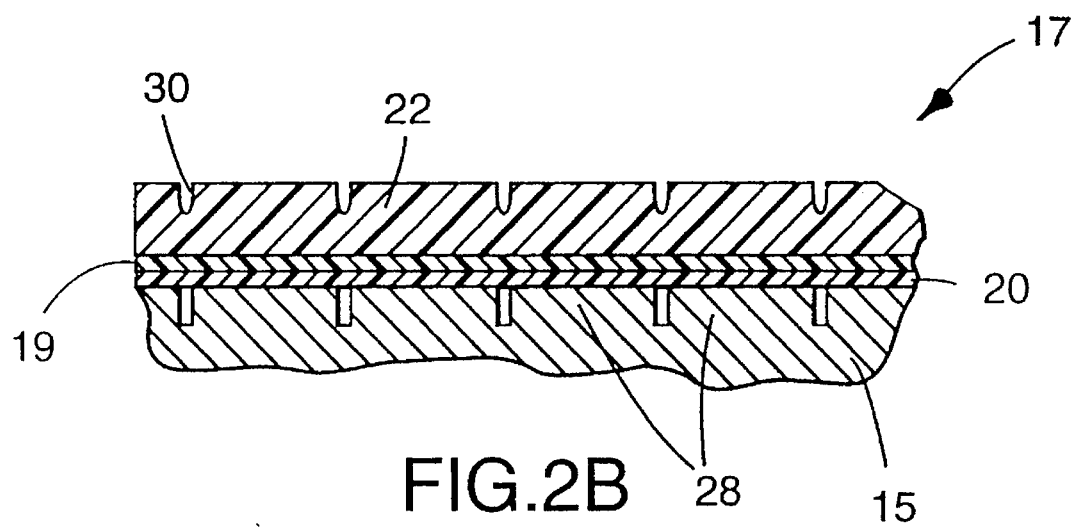
FIG. 2B is cross-sectional representation of another embodiment of magnetic recording tape in accordance with this invention, like FIG. 2A except having different protrusions 28 on the roller.

Cross-sectional views (not to scale or in exact proportions) of a web or coated sheet made by the first coating method described above are seen in FIGS. 2A and 2B. In FIG. 2A, the polyester substrate 19 has the magnetic layer 20 and the backside layer 22 on its two surfaces. The protrusions 24 on the patterned roller 15 are shown in contact with the magnetic side 20 of the web, with curved depressions 26 corresponding to the parts of the roller between the protrusions 24 in the backside layer. In FIG. 2B, alternate protrusions 28 result in a different configuration of backside depressions 30. One example of the ratio of land to depression area could be found by taking the ratio of the sum of the line segments representing the surface of the backside coating 22 divided by the sum of the lengths of the tops of gaps or grooves 26 in FIG. 2A.

Roller 15 can be made in a number of ways. For example, a pattern of grooves may be machined or knurled into a sleeve which is installed over a base roller, facilitating the changing the pattern. Alternatively, a pattern, such as a repeating pattern of letters and numbers, may be formed on a thin metal sheet by known photolithographic techniques, and the thus formed sheet could then be wrapped around and attached to a smooth roller in order to impose a pattern of alphanumerics on the pigment binder coating.

An example of such a technique would involve the steps of: coating a brass sheet 100 micrometers thick with photoresist (e.g., PMER N-D40P from Tokyo-OHKA Ind. Co., Ltd.); drying the photoresist; exposing the photoresist to ultraviolet light through a photographic mask having the desired pattern in order to cure the photoresist in the areas corresponding to the pattern; developing the photoresist in developing solution (e.g., PMER N-A5 from Tokyo-OHKA Ind. Co., Ltd.); washing away residual developing solution; drying the sheet; etching away undeveloped or uncured photoresist with an acid etchant (e.g., $FeCl_3$/HCl dilute solution); washing away the acid etchant; drying the sheet and removing the uncured photoresist; and wrapping the brass sheet, having protrusions corresponding to the pattern, around and attaching it to a roller.

For process reasons (e.g., improved smoothing of the coating by the smoothing device 11), it may be desirable to vary the tension in the polymeric sheet at different places in the process. Thus one may desire greater tension between nip roll 3 and roller 15 than exists both before and after that part of the process. A zone of increased tension can be isolated by using a vacuum within roller 15 to pull the coated sheet down firmly onto the roller surface. If the roller were made hollow, the vacuum could reach the sheet by means of slots or perforations in the roller and a vacuum source connected to the inside of the roller. Such a roller may be called a vacuum pull roll. In this way, the sheet in between idler roller 9 and patterned roller 15 might be subject to greater stress than exists elsewhere in the process by means of tension applied by other rollers, such as idler roller 13. The functions for the patterned roll and vacuum pull roll can be separated by adding a separate patterned roller between roller 15 and idler roll 13.

The finished coated polymeric sheet can have the following preferred characteristics:

Thickness of polymeric coating: less than 30 and preferably in the range of 0.2–3 micrometers;

Typical depth of depressions: up to 1 μm; or up to about 1.5 micrometer in the case of the embossed or V-groove depressions.

Aspect ratio (ratio of greatest width to depth) of depressions or grooves: 100/1–10,000/1, deeper in the case of embossed or V-groove depressions (0.4/1–511).

Depression depth affects important properties of a recording tape backside, such as tracking, friction, and winding characteristics.

In the case of V-groove depressions, a useful range for the separation from the center of one V to the next (center-to-center distance) is 0.5 to 300 micrometers, preferably 0.5–2 micrometers.

One difference between the present invention and techniques known in the art for enhancing air bleed or winding characteristics of tapes is the smoothness of the land areas which can be calendered to excellent smoothness. Known techniques, mentioned under Background above, have added small particulates to the backside coating formulation to create small surface projections or artificial roughness. However, such projections can wear away over time, losing some of their effect. The present invention achieves good air bleed, as compared with known recording tapes, while offering the smooth land surfaces without projections to wear down.

To assess the winding characteristics of a magnetic tape, a test method, called the air bleed test, for determining the air bleed time of the backside coating is used. The objective of the test is to measure the time required for atmospheric air to seep underneath a stationary magnetic tape sample into a space under vacuum and raise the air pressure there by a fixed amount. Thus, less time indicates faster air bleed which is desired.

The test apparatus comprises a flat horizontal vacuum head, a pressure gauge, a digital time display, a power switch and a start button. The vacuum head has three apertures: an outer ring, an inner ring and a middle slot. Once the tape sample is in place and the start button is pressed, the test proceeds automatically.

To run the test, a sample of magnetic tape at least 0.25 in (6.4 mm) wide and about 6 to 9 in (152 to 226 mm) long is cut and laid over the vacuum head with the backside coating surface facing downward. The tape sample and the vacuum head should be relatively free of dust and other debris. No bumps or deformities are allowed between the tape sample and the vacuum head.

The power switch is turned on, causing a vacuum to be drawn through the outer ring which pulls the tape sample firmly down onto the vacuum head. The tape sample should cover the entire surface of the vacuum head with no apparent wrinkles or bumps. This vacuum seal is maintained for the duration of the test.

The start button is pressed to initiate the test. First, vacuum under the tape is drawn down to 4.0 lb/in$^2$ (207 Torr) gauge pressure below atmosphere through the inner ring. The inner ring aperture is then sealed off automatically from the vacuum source and the timer is started. Thus a small vacuum chamber is effectively formed by the channel in the vacuum head corresponding to the inner ring with the magnetic tape sample as its top. Air leaks into this chamber from the middle slot, which is constantly vented to atmospheric pressure. When the pressure under the tape has been raised to 3.0 lb/in$^2$ (155 Torr) gauge pressure the test is concluded. The elapsed time in seconds shown on the display is taken as a measure of the ability of the magnetic tape to bleed off entrapped air during winding on a reel of tape. Air bleed time comparisons should be made for samples having the same substrate thickness, since that can affect the test outcome.

EXAMPLE 1

Magnetic recording tape was made in accordance with this invention by means of a coating process as described above. The procedure for preparing the dispersion used, starting with three mixtures is as follows:

| Mixture A: | |
|---|---|
| Material | Kg. |
| Methyl ethyl Ketone (MEK) | 5.86 |
| Toluene | 29.32 |
| Tetrahydrofuran (THF) | 547.59 |
| Dispersing Agent (quaternary ammonium acetate furnished as purified Emcol Acetate from Witco Chemical Co., Inc. | 2.05 |
| Dispersing Agent (phosphorylated polyoxyalkyl polyol as described in U.S. Pat. No. 4,732,812 75% solution in toluene) | 1.82 |
| Phenoxy resin solution (25 weight % in 60:40 MEK:toluene mixture) | 159.36 |
| carbon black | 68.18 |
| Polyurethane (derived from adipic acid, 1,4 butane diol and diphenyl methane diisocyanate and obtained as Estane 5707-F1P from BF Goodrich | 398.95 |

Mixture B:

Mixture of alumina powder in THF weighing 12.95 Kg and comprising:

73 weight percent alumina

1% phosphorylated polyoxyalkyl polyol dispersant described above

1% Emcol phosphate dispersant

25% THF

The first three Mixture A materials are added in the order listed to a 208 liter vessel with a water filled cooling jacket (Shar mixer) mixing at slow speed. Mixing of the vessel contents is continued while the remaining Mixture A materials are added in the order listed, and the vessel is sealed as well as possible to minimize solvent loss during mixing. Shar mixing is continued at 4000 rpm (rotations per minute) for 3 hours. Temperature of the vessel contents is maintained below 21° C.

The vessel contents from the Shar mixer are then milled in a horizontal sand mill containing steel milling media. Shaft speed of the sand mill is about 900 rpm. Dispersion temperature is not to exceed 35° C. during milling. The milled dispersion is transferred to a Shar mixer, and the Mixture B material is added slowly while mixing at high speed. The mixing is continued for 60 minutes after Mixture B has been completely added. The dispersion is then filtered.

Before use in the coating process, the dispersion is completed by adding and blending with the dispersion a polyfunctional isocynate (CB601 polyisocyanate from Mobay Chemical Corp.) in a proportion of 4:16 Kg per 36.4 Kg dry coating dispersion weight.

The above described dispersion was used to coat a polyester substrate about 6 micrometers thick. The wet coated substrate was conveyed over a roller the surface of which had a multiplicity of grooves around its circumference so that the dry side of the substrate was in contact with the roller. The surface of the roller was heated by hot air directed at its back side from an electric air blower gun. After being conveyed through a drying oven, some of the tape was calendered, and some was not. Both the calendered and uncalendered tapes were embodiments of the invention as described herein, having backside coatings with a plurality of grooves. The coated substrate was later slit into an appropriate width for testing as a magnetic recording tape.

The magnetic recording medium coated sheet of Example 1 was tested using the air bleed test described earlier. In addition, a control sample representative of commercially available data cartridge tape was tested for air bleed. The results are shown in Table 1.

| Sample 1 | Air Bleed Time | Seconds |
|---|---|---|
| Control | 299 | |
| Example 1 Uncalendered | 108 | 125* |
| Example 1 Calendered | 164 | 180* |

*test on different part of patterned sheet

What is claimed is:

1. A magnetic recording medium comprising a substrate, a magnetizable layer on a front side thereof and a crosslinked polymeric coating on the backside thereof wherein the coating on the backside ranges from about 0.2 to 3 microns thick and has a smooth surface having a surface roughness not greater than 0.05 microns Ra except that said coating includes in the otherwise smooth surface a plurality of depressions having a depth ranging from 1–50% of the average thickness of said coating and wherein the ratio of the greatest width of a depression to the depth of the depression is from 100/1 to 10,000/1.

2. The magnetic recording medium of claim 1 on which the depressions are in the form of identifying indicia, selected from alphanumerics and other identifying marks.

3. The magnetic recording medium of claim 1 in which the depressions are grooves and the ratio of land area to depression area on the surface of the coating ranges from about 0.01/1 to 10/1.

4. The coated polymeric sheet of claim 1 wherein the thickness of the substrate is 4 to 40 micrometers.

5. The magnetic recording medium of claim 4 wherein said crosslinked polymeric coating is a pigment binder coating comprising a pigment, selected from the group consisting of carbon particles, alumina, titania, and magnetic pigments, in a cross-linked polymer binder.

6. The magnetic recording medium of claim 4 wherein the pigment is carbon black having a particle size generally less than 200 nanometers.

* * * * *

UNITED STATES PATENT AND TRADEMARK OFFICE
CERTIFICATE OF CORRECTION

PATENT NO.: 5,589,247

DATED: December 31, 1996

INVENTOR(S): Wallack et al.

It is certified that error appears in the above-identified patent and that said Letters Patent is hereby corrected as shown below:

ABSTRACT, "A. As being" should be --A. being--.

Col. 7, line 3, "(0.4/1-511)" should be --(0.4/1-5/1)--.

Signed and Sealed this

Sixteenth Day of September, 1997

*Attest:*

BRUCE LEHMAN

*Attesting Officer*          *Commissioner of Patents and Trademarks*